US006831429B2

United States Patent
Fu (10) Patent No.: US 6,831,429 B2
(45) Date of Patent: Dec. 14, 2004

(54) PREDICTION OF AVAILABLE TORQUE AND POWER FROM BATTERY-POWERED TRACTION MOTOR

(75) Inventor: Zhenxing Fu, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 86 days.

(21) Appl. No.: 10/384,962

(22) Filed: Mar. 10, 2003

(65) Prior Publication Data

US 2004/0178756 A1 Sep. 16, 2004

(51) Int. Cl.⁷ .................................................. B60K 6/04
(52) U.S. Cl. ....................... 318/139; 318/432; 318/471; 318/479
(58) Field of Search ........................ 318/139, 430–434, 318/459, 471, 478–479; 388/903, 934; 180/65.2

(56) References Cited

U.S. PATENT DOCUMENTS

| | | | |
|---|---|---|---|
| 5,442,268 A | * 8/1995 | Goodarzi et al. | 318/432 |
| 5,477,114 A | * 12/1995 | Yamada et al. | 318/457 |
| 5,533,166 A | * 7/1996 | Yoshida et al. | 388/811 |
| 6,175,303 B1 | 1/2001 | Theofanopoulos et al. | |
| 6,232,744 B1 | 5/2001 | Kawai et al. | |
| 6,233,508 B1 | * 5/2001 | Deguchi et al. | 701/22 |
| 6,239,575 B1 | 5/2001 | Xu et al. | |
| 6,242,873 B1 | 6/2001 | Drozdz et al. | |
| 6,316,893 B1 | * 11/2001 | Rasimus | 318/432 |
| 6,336,063 B1 | 1/2002 | Lennevi | |
| 6,359,419 B1 | 3/2002 | Verbrugge et al. | |
| 6,441,619 B1 | 8/2002 | Araki et al. | |
| 6,449,537 B1 | 9/2002 | Phillips et al. | |
| 6,470,983 B1 | * 10/2002 | Amano et al. | 180/65.2 |
| 6,484,833 B1 | 11/2002 | Chhaya et al. | |
| 6,490,511 B1 | 12/2002 | Raftari et al. | |

2002/0062183 A1   5/2002   Yamaguchi et al.

FOREIGN PATENT DOCUMENTS

EP   0748038   8/2002

* cited by examiner

Primary Examiner—Bentsu Ro
(74) Attorney, Agent, or Firm—MacMillan, Sobanski & Todd, LLC (57) ABSTRACT

Available torque output from a battery-powered traction motor system in a vehicle is estimated, wherein the system includes a high-voltage battery coupled to a traction motor by an inverter, wherein the inverter is controlled in response to a torque/speed command within an inverter controller, and wherein the system further includes a DC-to-DC converter coupled to the high-voltage battery to provide a reduced voltage to charge a low-voltage battery. Battery operating conditions of the high-voltage battery are determined including available battery power and battery voltage. Traction motor operating conditions including a flux linkage and other electrical parameters are determined. The battery information including voltage, current, and internal resistance is transformed into synchronous coordinates. An available quadrature current corresponding to the maximum available torque is determined in response to the traction motor operating conditions and the battery voltage in the synchronous coordinates. The available quadrature current is clamped in response to predetermined clamping limits. A first estimated available torque is determined in response to the clamped available quadrature current and the traction motor operating conditions. A high-voltage power usage is determined including power consumed in the DC-to-DC converter, power loss in the DC-to-DC converter, and power loss in the traction motor and inverter. An angular speed of the traction motor is measured. A second estimated available torque is determined in response to the available battery power, the high-voltage power usage, and the angular speed. A lesser one of said first and second estimated available torques is selected as the available torque output from the battery-powered traction motor system.

20 Claims, 4 Drawing Sheets

PREDICTION OF AVAILABLE TORQUE AND POWER FROM BATTERY-POWERED TRACTION MOTOR

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to an electric traction motor drive system for an electric vehicle (EV) or a hybrid electric vehicle (HEV), and, more specifically, to the prediction of torque and power capabilities in connection with controlling the vehicle.

Worldwide demand for fuel-efficient, low-emission vehicles has led to the development of alternative powertrain architectures, such as Integrated Starter Alternator (ISA) systems for stop/start vehicles, the Electric Vehicles (EV), and the combination of an electric traction motor with a downsized internal combustion (IC) engine known as the Hybrid Electric Vehicle (HEV).

An HEV may utilize a powertrain structure combining the electric traction motor and the IC engine either in series or in parallel. Typically, the traction motors used are AC electric machines, such as induction machines, reluctance machines, brushless DC machines, or permanent magnet synchronous machines. When driving the vehicle at low speeds, the powertrain is commanded to operate in a purely electric propulsion mode. When vehicle speed increases to a certain level, the IC engine is engaged to provide power to the driveline via a mechanical clutch. After the engagement of the IC engine, the traction motor may provide torque boost to the driveline, charge the main battery, provide driveline synchronization during gear shifts, or provide active damping of driveline oscillations to improve drivability.

The traction motor is typically powered from a high voltage battery via an inverter. A DC/DC converter inside an inverter module typically converts the electric power on the high voltage bus to a lower voltage on a low voltage bus to provide electric power to other electrical loads in the vehicle and to charge a low voltage battery.

Considerable improvement in fuel economy and emission reduction can be obtained from hybrid vehicles. HEV's permit the use of smaller sized IC engines because the electric traction motor provides power at low speeds and torque boost at high speeds. Furthermore, the reduced operating range of the IC engine allows it to be configured to operate at its highest efficiencies at all times. High efficiency is also achieved for battery charging.

In order to optimize fuel efficiency, reduce emission level, and improve driving performance, a vehicle system controller issues operating commands according to an optimal fuel efficiency map of the IC engine. The manner in which HEV and EV propulsion systems are controlled is a primary determinant of the overall efficiency obtained. Consequently, it is desirable to increase efficiency and performance by finding improved control methods and apparatus.

SUMMARY OF THE INVENTION

The present invention has the advantages of providing increased efficiency and increased performance of operation of HEV's and EV's by virtue of improved control based on determination of instantaneous torque and/or power capabilities of the traction motor and battery subsystem.

To optimally control various vehicle operations, both maximum and minimum torque and power capability information at transient and continuous operations of the traction motor and battery subsystem are necessary. These vehicle operations include propelling the vehicle in pure electric mode at low speeds, cranking the IC engine using the traction motor, providing torque boost from the traction motor to the driveline, charging the main battery, providing driveline synchronization during gearshifts, and providing active damping of driveline oscillations to improve drivability. A reduction in complexity of the vehicle system controller can also be achieved by incorporating "available torque" and "available power" information into the control strategies of the vehicle system controller. In addition, by knowing torque and power capabilities of the combined traction motor and battery subsystem, the system controller can avoid issuing these commands that exceed the instantaneous capabilities of the traction motor and battery.

The present invention recognizes that at any particular operating conditions, the torque and power capabilities of the traction motor and battery subsystem can be limited by either 1) the contemporaneous torque/power capacity of the traction motor or 2) the contemporaneous power available from the high voltage battery.

In one aspect of the invention, a method is provided for estimating available torque output from a battery-powered traction motor system in a vehicle, wherein the system includes a high-voltage battery coupled to a traction motor by an inverter, wherein the inverter is controlled in response to a torque or speed command within an inverter controller, and wherein the system further includes a DC-to-DC converter coupled to the high-voltage battery to provide a reduced voltage to charge a low-voltage battery. The method comprises determining battery operating conditions of the high-voltage battery including available battery power and battery voltage. Traction motor electrical parameters such as resistance, inductances, and flux linkage corresponding to operating conditions are determined, with consideration of temperature and magnetic saturation. The battery information (such as voltage, current, and internal resistance) is transformed into synchronous coordinates. An available quadrature current corresponding to the maximum available torque is determined in response to the present machine operating conditions and the battery voltage in the synchronous coordinates. The available quadrature current is clamped in response to predetermined clamping limits. A first estimated available torque is determined in response to the clamped available quadrature current and the traction motor operating conditions. A high-voltage power usage is determined including power consumed in the DC-to-DC converter, power loss in the DC-to-DC converter, and power loss in the traction motor and inverter. An angular speed of the traction motor is measured. A second estimated available torque is determined in response to the available battery power, the high-voltage power usage, and the angular speed. A lesser one of said first and second estimated available torques is selected as the available torque output from the battery-powered traction motor system.

DETAILED DESCRIPTION OF PREFERRED EMBODIMENTS

Figure 1:
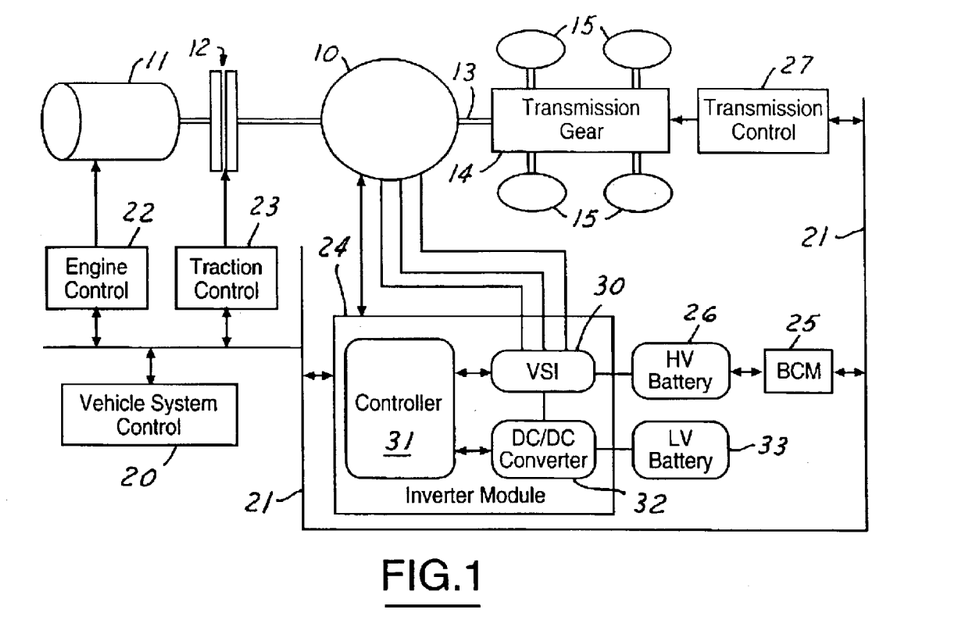
FIG. 1 is a system block diagram of a hybrid propulsion powertrain system for an HEV.

A schematic diagram of an HEV powertrain system including improved system control based on the prediction of maximum and minimum, transient and continuous torque and power is shown in FIG. 1. As used herein, minimum torque and power mean the maximum negative torque and power consumed by the traction motor and battery subsystem when in a battery charging mode.

An electric traction motor 10 and an IC engine 11 are coupled together via a clutch 12. A driven output shaft 13 is coupled to a transmission gearbox 14 for driving vehicle wheels 15. A vehicle system control (VSC) 20 communicates via a multiplex bus 21 (such as a controller area network or CAN bus) with individual subsystem controllers including an engine control 22, a traction control 23, and inverter module 24, a battery control module (BCM) 24 for controlling a high voltage battery 26, and a transmission control 27.

Inverter module 24 includes a voltage source inverter (VSI) 30 receiving a high voltage input from battery 26 and providing multiple phase drive signals to motor 10. An inverter controller 31 is coupled to VSI 30 for commutating the phase drive signals as is known in the art. A high voltage is provided from VSI 30 (i.e., power originating from high voltage battery 26 when in a discharge mode or from motor 10 when in a charging mode) to a DC-to-DC converter 32 which converts the high voltage to a lower voltage suitable for recharging a low voltage battery 33 and powering any low voltage loads (not shown) within the vehicle.

Data concerning the high voltage battery is communicated from BCM 25 to inverter controller 31 via CAN bus 21 during vehicle operation. Any commercially available battery system is employed wherein data is provided that identifies battery parameters including presently available battery transient power, available battery continuous power, minimum transient power, and minimum continuous power. The battery data may preferably also include battery terminal voltage, battery current, and battery internal resistance. Operating conditions of DC-to-DC converter 32 including its output voltage and current are measured within inverter module 24 and provided to inverter controller 31.

Figure 2:
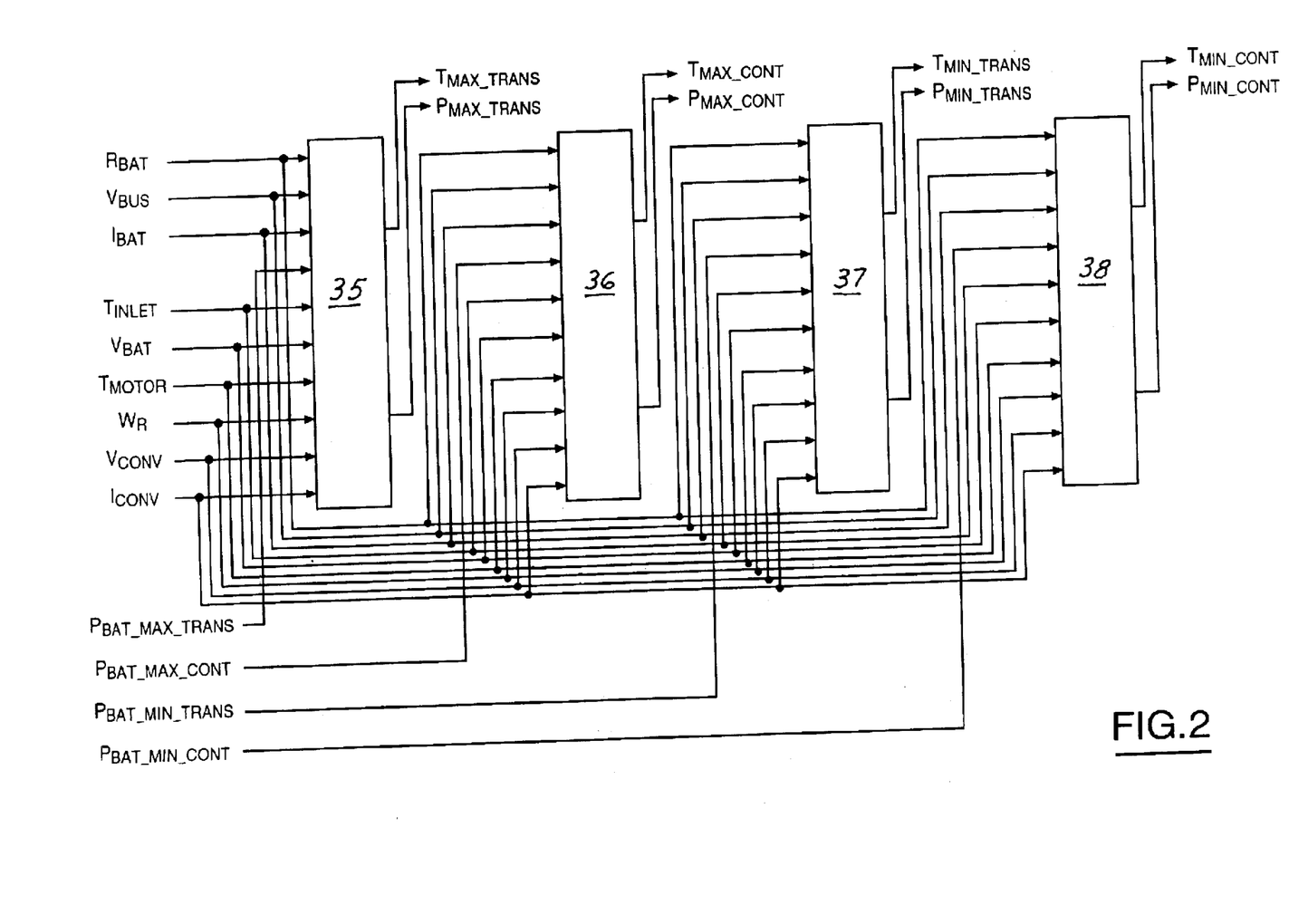
FIG. 2 is a block diagram of calculation blocks of the present invention for predicting maximum and minimum torque and power capability at transient and continuous operation of the traction motor and battery subsystem.

FIG. 2 shows calculation blocks 35, 36, 37, and 38 for predicting maximum transient values, maximum continuous values, minimum transient values, and minimum continuous values of torque and power, respectively. Nomenclature used in FIGS. 2–8 is shown in the following table.

| Variable Name | Meaning |
| --- | --- |
| $P_{bat\_max\_trans}$ | maximum transient power available from the HV battery in discharging mode |
| $P_{bat\_max\_cont}$ | maximum continuous power available from the HV battery in discharging mode |
| $P_{bat\_min\_trans}$ | minimum transient power available from the HV battery in charging mode |
| $P_{bat\_min\_cont}$ | minimum continuous power available from the HV battery in charging mode |
| $P_{max\_trans}$ | maximum transient power available from the HV battery and traction motor in motoring |
| $P_{max\_cont}$ | maximum continuous power available from the HV battery and traction motor in motoring |
| $P_{min\_trans}$ | minimum transient power available from the HV battery and traction motor in generating |
| $P_{min\_cont}$ | minimum continuous power available from the HV battery and traction motor in generating |
| $T_{max\_trans}$ | maximum transient torque available from the HV battery and traction motor in motoring |
| $T_{max\_cont}$ | maximum continuous torque available from the HV battery and traction motor in motoring |
| $T_{min\_trans}$ | minimum transient torque available from the HV battery and traction motor in generating |
| $T_{min\_cont}$ | minimum continuous torque available from the HV battery and traction motor in generating |
| $R_{bat}$ | Battery internal resistance from BCM |
| $V_{bus}$ | measured high voltage (HV) at the input of inverter |
| $V_{bat}$ | battery terminal voltage reported by BCM |
| $I_{bat}$ | battery current draw reported by BCM |
| $T_{inlet}$ | measured coolant temperature at the inlet of an inverter cooling system |
| $T_{motor}$ | measured motor stator temperature |
| $W_r$ | motor electrical angular velocity estimated from position sensor signals |
| $V_{conv}$ | measured output voltage of the DC/DC converter |
| $I_{conv}$ | measured output current of the DC/DC converter |
| a | duty cycle of inverter PWM signal |

The prediction algorithms used in calculation blocks 35–38 are substantially identical except that each uses different values for the available battery power (and possibly some differences in thermal modeling as appropriate). For purposes of illustration, the prediction of maximum transient torque and power ($T_{max\_trans}$ and $P_{max\_trans}$) is shown in greater detail in FIGS. 3–8.

Figure 3:
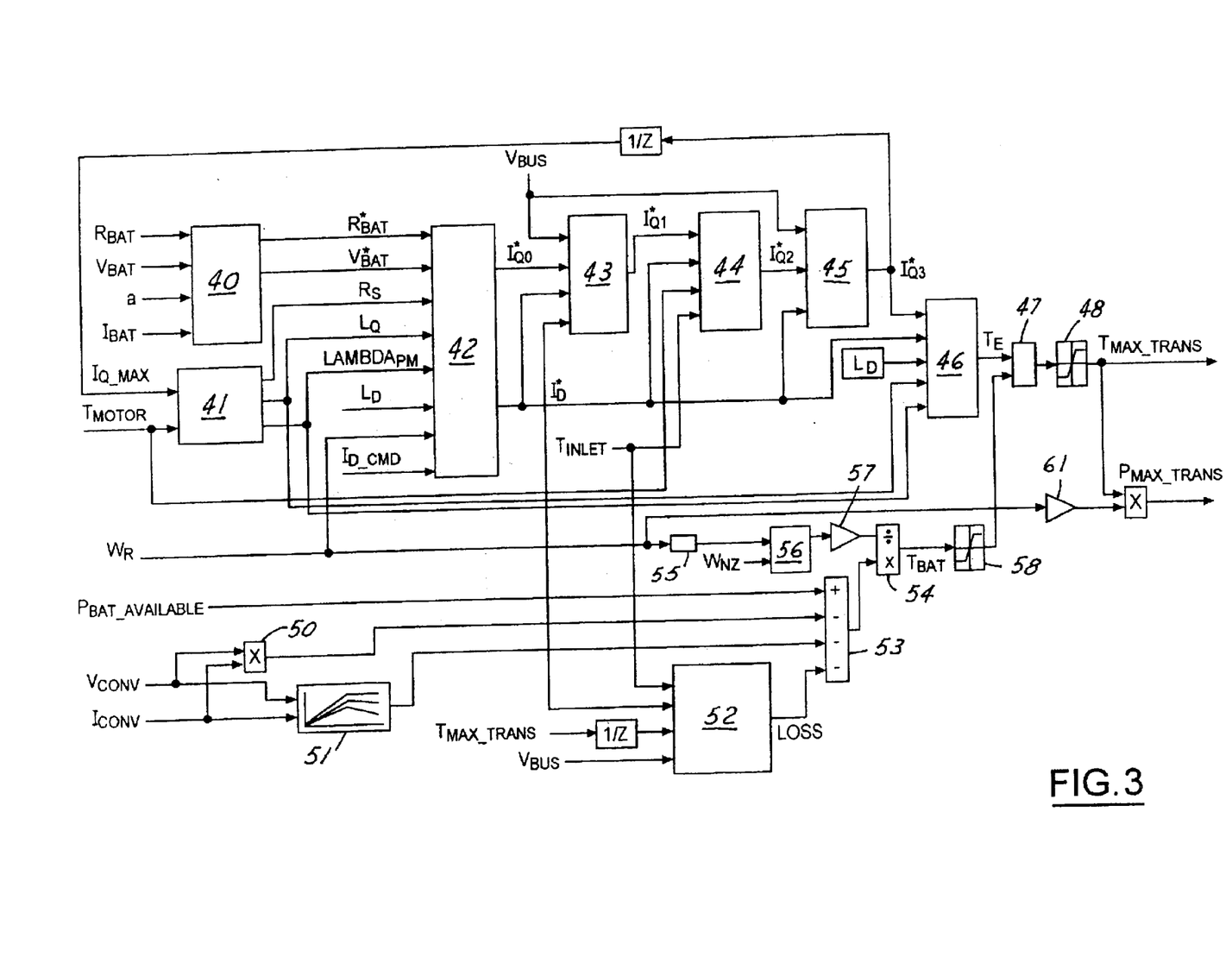
FIG. 3 is a block diagram showing a calculation block in greater detail for predicting maximum transient torque and power.

FIG. 3 shows the overall calculations for performing the torque and power predictions of the present invention. The governing electrical equations or mathematical model of an AC electric machine used as a traction motor typically are highly nonlinear and have electrical parameters that vary with rotor position. The corresponding model known as a phase variable model in stationary coordinates is difficult to analyze and use for control purposes. In order to eliminate the parameter dependence on rotor position, a Park transformation is typically used to transform the phase variable model in stationary coordinates into the so-called d-q model in synchronous coordinates. The synchronous coordinates rotate at the fundamental electric frequency of the electric machine. Machine models represented in synchronous coordinates are much more convenient to use for analysis and control purposes.

Referring to FIG. 3, present (i.e. contemporaneous) battery operating conditions including $V_{bat}$, $I_{bat}$, and $R_{bat}$ are converted into quantities $R^*_{bat}$ and $V^*_{bat}$ in the synchronous coordinate frame by a synchronous coordinate battery model 40. A motor thermal and magnetic saturation model 41 estimates machine electrical parameters, such as stator winding resistance $R_s$, q-axis inductance $L_q$, and magnet flux linkage $Lambda_{PM}$ in response to the present machine temperature $T_{motor}$ and the one-loop time delayed electric current $I_{q\_max}$ corresponding to the previous value of $T_{max\_trans}$ in order to account for the effects of temperature and magnetic saturation. A maximum available torque current $I^*_{q0}$ is calculated in a combined battery/inverter/motor model 42 in synchronous coordinates using the previously described estimated machine parameters and battery information together with a d-axis inductance $L_d$, angular speed $W_r$, and a previous peak current command $I_{d\_cmd}$ (such as the direct current command for peak transient operation in the current example). Transient operation is defined as an operation of less than one second duration (i.e., the system only has to deliver a specified level of torque for one second or less).

The initially generated value of torque current $I^*_{q0}$ is clamped in a series of functional blocks 43, 44, and 45. A current/voltage limiter block 43 clamps current $I^*_{q0}$ to a first limited value $I^*_{q1}$ so that the maximum current and voltage conditions of the inverter and electric machine are not exceeded. Typically, the loci of the maximum current limit define a circle and the loci of the maximum voltage limit define an ellipse. Block 43 calculates the current limit circle and the voltage limit ellipse based on measured machine speed $W_r$, the high bus voltage $V_{bus}$, and a maximum available direct current $I^*_{d0}$ from model 42. To account for thermal effects on the maximum torque and power capability of the electric machine, the maximum torque component current $I^*_{q1}$ is further clamped to a second limited value $I^*_{q2}$ by a motor thermal foldback limiter 44 in response to measured coolant temperature $T_{inlet}$ and machine temperature $T_{motor}$ in order to protect the inverter and electric machine from excessive heat and thermal damage.

The torque component current $I^*_{q2}$ is further clamped to a third limited value $I^*_{q3}$ in response to the present state of measured voltage $V_{bus}$. To properly protect the HV battery and extend battery life, the HV battery must be protected from excessive charging or discharging. For example, when the battery voltage is too high due to applying the generating power of the electric machine into a fully charged battery, the charging current of the machine must be de-rated to prevent the battery voltage exceeding its maximum allowable value. On the other hand, when HV battery voltage is too low due to excessive motoring power draw of the machine from an excessively discharged battery, the motoring torque must be de-rated to prevent the HV battery from going below the minimum allowable terminal voltage. Clamping block 45 utilizes lookup tables to determine the value of $I^*_{q3}$ according to the foregoing strategy.

With the torque q-axis current $I^*_{q3}$ properly clamped, a first estimated available torque is calculated in a first torque estimator 46 in response to flux linkage Lambda$_{PM}$, inductances $L_q$ and $L_d$, and direct current $I^*_{d0}$. This first estimated maximum torque $T_e$ represents the actual maximum torque capacity of the electric machine. This first estimated maximum torque is then compared with a second estimated available torque determined in response to available battery power in a minimum selection block 47 which passes through the lower of the two torque estimates. The selected minimum may be further limited to a maximum desired system torque in a limiter 48, thereby yielding the maximum available torque $T_{max\_trans}$ from the combined battery and traction motor subsystem.

The second estimated available torque (which is based on the ability of the high voltage battery to supply or absorb the maximum torque of which the electric machine is capable) is determined using the equations:

$$T_{bat\_available} = P_{bat\_available}/(W_r/p)$$

and $$P_{bat\_available} = P_{bat\_max\_trans} - P_{out\_LV} - P_{loss\_LV} - P_{loss\_vsi\_motor}$$

where p is the number of magnetic pole pairs of the machine, $P_{out\_LV}$ is the power output by the DC-to-DC converter (calculated by multiplier 50), $P_{loss\_LV}$ is a predetermined loss that occurs in the DC-to-DC converter under various operating conditions as stored in a lookup table 51, and $P_{loss\_vsi\_motor}$ represents total power losses of the inverter and traction motor at various operating conditions as stored in a lookup table 52. These values of power consumed and power lost are subtracted from available battery power in a summer 53. The sum which represents the power available for producing torque is provided to the multiplying input of a divider 54.

Torque production is equal to power divided by angular speed. In order to obtain a properly scaled value of speed for applying to the dividing input of divider 54, the measured angular speed $W_r$ is processed as follows. Absolute value block 55 calculates the absolute value of machine speed $W_r$, which is then compared to a small positive constant $W_{NZ}$ in block 56 to prevent binary overflow in the fixed point implementation of the division operation done in divider 54. Amplifier 57 has a gain of 1/p, where p is the number of magnetic pole pairs of the traction motor.

The maximum available torque $T_{bat}$ from divider 54 based on battery capacity is clamped by a torque limiter 58 and is then provided to minimum selection block 47.

The predicted maximum transient torque $T_{max\_trans}$ from limiter 48 is coupled to one input of a multiplier 60. Measured angular speed $W_r$ is coupled to a second input of multiplier 60 via an amplifier 61 having a gain equal to the inverse of number of pole pairs p. The product of multiplier 60 is the predicted maximum transient power $P_{max\_trans}$.

Figure 4:
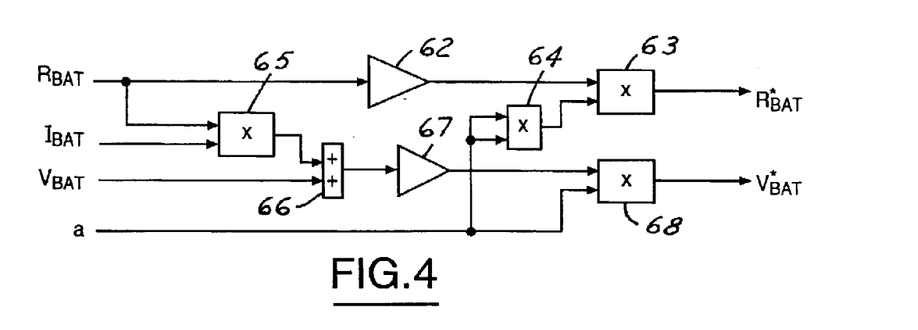
FIG. 4 is a block diagram of a battery model for transforming to synchronous coordinates.

Synchronous coordinate battery model 40 is shown in greater detail in FIG. 4. Battery internal resistance $R_{bat}$ is converted to synchronous coordinates $R^*_{bat}$ by multiplying by a gain $K_{Rbat}$ in an amplifier 62 and then multiplying that product by the square of the PWM duty cycle $a^2$ in a multiplier 63. The value of $a^2$ is obtained from a multiplier 64.

Battery terminal voltage $V_{bat}$ is converted to the effective voltage in synchronous coordinates $V^*_{bat}$ by adding the voltage drop across the internal resistance (e.g., the product of $I_{bat}$ and $R_{bat}$ obtained in a multiplier 65) with $V_{bat}$ in a summer 66. The sum is multiplied by a gain $K_{Vbat}$ in an amplifier 67 and then by PWM duty cycle "a" in a multiplier 68.

Figure 5:
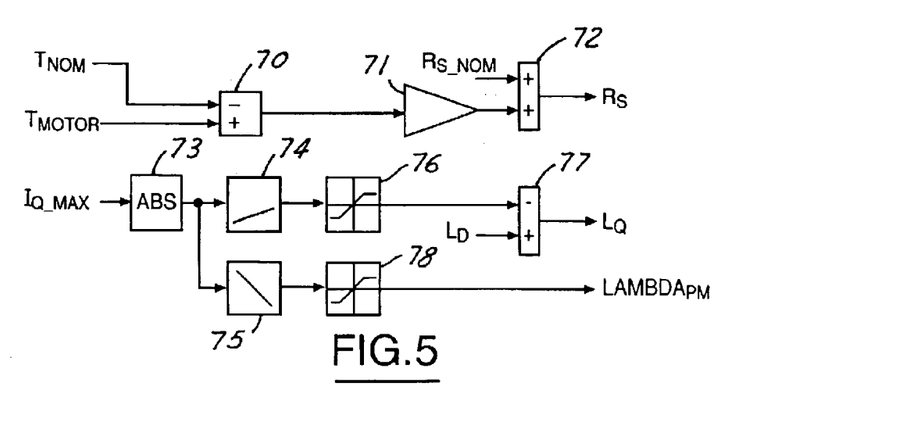
FIG. 5 is a block diagram of a motor thermal and saturation model.

Motor thermal saturation model 41 is shown in greater detail in FIG. 5. In order to improve the accuracy of the predicted torque and power capabilities of the traction motor, the effect of current operating conditions on the machine electrical parameters must be taken into account. Being a function of operating temperature, the actual machine phase resistance $R_s$ can be calculated within good accuracy in response to measured machine stator temperature $T_{motor}$ which is input to an adding input of a summer 70. The traction motor has a nominal stator resistance $R_{s\_nom}$ at a nominal temperature $T_{nom}$. $T_{nom}$ is input to a subtracting input of summer 70 and the temperature difference is multiplied by a temperature coefficient in an amplifier 71 according to a slope of resistance change versus temperature, as known in the prior art. The resistance change is added to nominal resistance $R_{s\_nom}$ in a summer 72 to produce the estimated stator resistance $R_s$.

An estimated q-axis inductance $L_q$ and an estimated flux linkage Lambda$_{PM}$ at the maximum transient torque condition are calculated within good accuracy by accounting for magnetic saturation. Time-delayed maximum q-axis current $I_{q\_max}$ (i.e., maximum torque current) is coupled through an absolute value block 73 to a current-to-inductance lookup table 74 (for providing a difference in inductance between $L_d$ and $L_q$) and a current-to-flux linkage lookup table 75 which are determined by experimental measurement. An inductance difference between $L_q$ and $L_d$ from lookup table 74 is clamped in limiter 76 and then coupled to a subtracting input of a summer 77. Direct inductance $L_{d\,is}$ coupled to an adding input of summer 77 and the estimated q-axis inductance $L_q$ corresponding to maximum transient torque condition is obtained. Similarly, magnet flux linkage corresponding to maximum transient torque condition Lambda$_{PM}$ is be found by using lookup table 75 after being properly clamped in a limiter 78.

Figure 6:
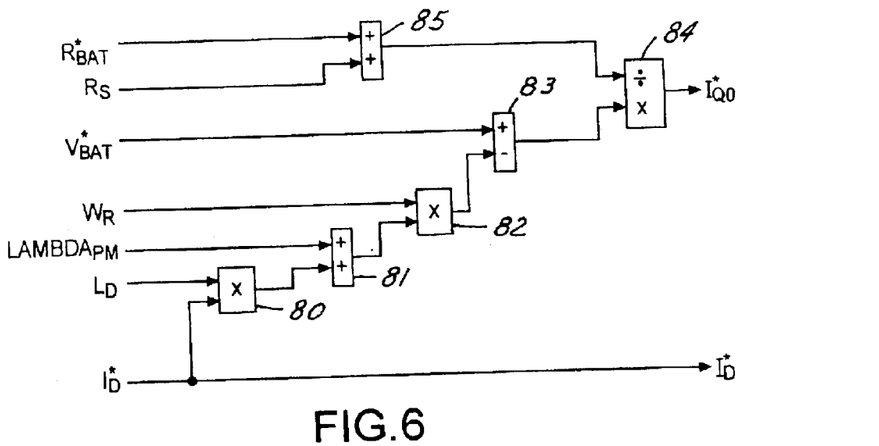
FIG. 6 is a block diagram of a combined high voltage battery and inverter model.

Battery/inverter/motor model 42 for calculating torque component current $I^*_{q0}$ for maximum transient torque conditions by combining the electrical equations of the battery and the electric machine is shown in greater detail in FIG. 6. The product of direct inductance $L_d$ and synchronous direct current $I^*_d$ from a multiplier 80 is provided to one input of a summer 81. Flux linkage Lambda$_{PM}$ is coupled to another input of summer 81 and the sum is provided to one input of a multiplier 82 which receives angular speed $W_r$ at its second input. The product from multiplier 82 is provided to a subtracting input of a summer 83. Synchronous battery voltage $V^*_{bat}$ is provided to an adding input of summer 83 and the resulting sum is provided to a multiplying input of a divider 84. The sum of synchronous battery resistance $R^*_{bat}$ and motor stator resistance $R_S$ is formed by a summer 85 and is provided to a dividing input of divider 84. Divider 84 provides the calculated maximum current $I^*_{q0}$.

Figure 7:
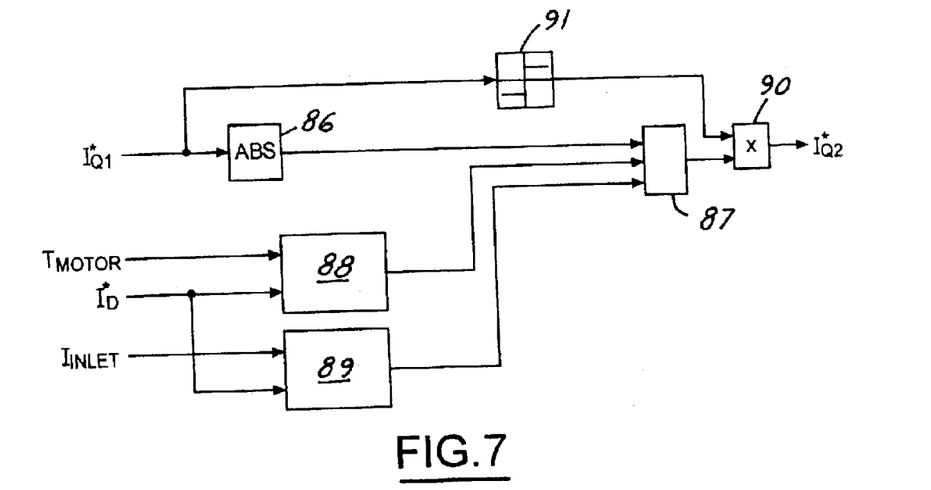
FIG. 7 is a block diagram of a motor and inverter thermal de-rating model.

Motor thermal foldback limiter 44 is shown in greater detail in FIG. 7. The first limited current value $I^*_{q1}$ is provided to an absolute value block 86 so that a positive current value is provided to one input of a minimum selector block 87. A motor thermal limit block 88 may comprise a lookup table that responds to motor temperature $T_{motor}$ and direct current $I^*_d$ to determine a de-rated q-axis current limit when motor temperature exceeds a threshold. An inverter coolant thermal limit block 89 may comprise a lookup table that responds to inverter coolant temperature $T_{inlet}$ and direct current $I^*_d$ to determine a de-rated q-axis current limit when inverter temperature exceeds a threshold. Each limiter block preferably implements a function wherein a q-axis current limit decreases linearly with increasing temperature over their respective thresholds and de-rates to zero at their maximum allowable temperatures. The lowest value selected by minimum selector block 87 is provided to one input of a multiplier 90. A sign block 91 extracts the positive or negative sign of current $I^*_{q1}$ and applies it to the remaining input of multiplier 90 so that the second limited q-axis current $I^*_{q2}$ has the same sign as $I^*_{q1}$.

Figure 8:
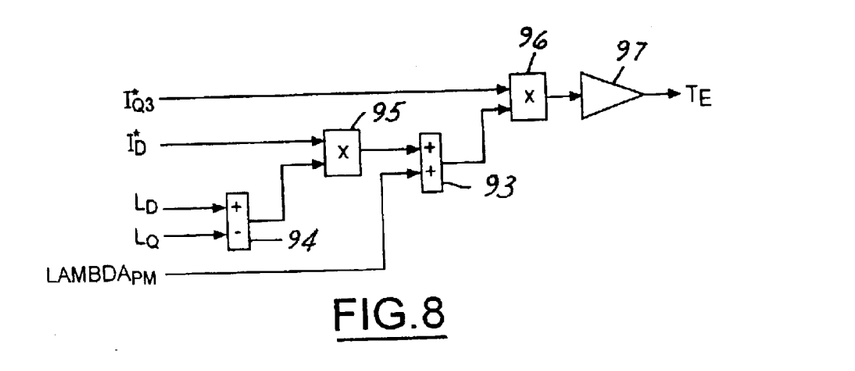
FIG. 8 is a block diagram showing an available torque calculation in greater detail.

Torque estimator 46 is shown in greater detail in FIG. 8. A standard torque equation is implemented as follows:

$$T_e = \frac{3p}{2}[LamdaPM \cdot I^*_{q3} + (L_d - L_q)I^*_d I^*_{q3}]$$

Thus, flux linkage Lambda$_{PM}$ is coupled to one input of a summer 93. A difference between direct inductance $L_d$ and quadrature inductance $L_q$ from a summer 94 is multiplied by synchronous direct current $I^*_d$ in a multiplier 95. The resulting product is provided to an input of summer 93. The sum from summer 93 is multiplied by limited q-axis current $I^*_{q3}$ in a multiplier 96. The output of multiplier 96 is coupled to an amplifier having a gain equal to 3p/2 to provide the first torque estimate $T_e$.

What is claimed is:

1. A method of estimating available torque output from a battery-powered traction motor system in a vehicle, said system including a high-voltage battery coupled to a traction motor by an inverter, said inverter controlled in response to a torque/speed command within an inverter controller, said system further including a DC-to-DC converter coupled to said high-voltage battery to provide a reduced voltage to charge a low-voltage battery, said method comprising the steps of:

determining battery operating conditions of said high-voltage battery
including available battery power and battery voltage;
determining traction motor operating conditions including electrical
parameters of said fraction motor;
transforming said battery operating conditions into synchronous coordinates;
determining an available quadrature current corresponding to a maximum available torque in response to said electrical parameters and said battery voltage in said synchronous coordinates;
clamping said available quadrature current in response to predetermined clamping limits to prevent said traction motor system from exceeding maximum current and voltage limits, to protect said traction motor and said inverter from excessive thermal heating, and to protect said high voltage battery from excessive charging or discharging;
determining a first estimated available torque in response to said clamped available quadrature current and said traction motor operating conditions;
determining high-voltage power usage including power consumed in said DC-to-DC converter, power loss in said DC-to-DC converter, and power loss in said traction motor and inverter;
measuring an angular speed of said traction motor;
determining a second estimated available torque in response to said available battery power, said high-voltage power usage, and said angular speed; and
selecting a lesser one of said first and second estimated available torques as said available torque output.

2. The method of claim 1 further providing an estimated available power output, said method including the step of:
determining said estimated available power output in response to multiplying said available torque output by said angular speed.

3. The method of claim 1 wherein said available battery power is comprised of a maximum output power in a discharge mode of said high-voltage battery and wherein said available torque output is comprised of an estimated maximum torque output that can be produced by said battery-powered traction motor system in said discharge mode.

4. The method of claim 1 wherein said available battery power is comprised of a maximum input power in a charge mode of said high-voltage battery and wherein said available torque output is comprised of an estimated maximum torque load that can be consumed by said battery-powered traction motor system in said charge mode.

5. The method of claim 1 wherein said available battery power is comprised of a transient capacity of said high-voltage battery and wherein said available torque output is a corresponding transient torque capacity.

6. The method of claim 1 wherein said available battery power is comprised of a substantially continuous capacity of said high-voltage battery and wherein said available torque output is a corresponding continuous torque capacity.

7. The method of claim 1 wherein said battery operating conditions further include battery current and battery internal resistance and wherein said transforming step includes transforming said battery internal resistance into said synchronous coordinates.

8. The method of claim 1 wherein said traction motor operating conditions further include motor temperature and magnetic saturation, and wherein said method further comprises the step of:

estimating a motor stator resistance, a motor inductance, and a flux linkage in response to said motor temperature and magnetic saturation using a motor thermal saturation model.

9. The method of claim 8 wherein said available quadrature current is determined in a system model in response to a current command, said flux linkage, said battery voltage, said motor stator resistance, said motor inductance, and said angular speed.

10. The method of claim 1 wherein said traction motor operating conditions further include motor temperature, and wherein said clamping limits are determined in response to a current command and said motor temperature.

11. The method of claim 1 wherein said traction motor operating conditions further include motor magnetic saturation, and wherein said first estimated available torque is determined in response to said clamped available quadrature current, a flux linkage, and a motor inductance.

12. The method of claim 1 wherein said vehicle is a hybrid electric vehicle including an internal combustion engine coupled to said battery-powered traction motor system.

13. A torque estimator for an electric vehicle having a battery-powered traction motor system wherein said system includes a high-voltage battery coupled to a traction motor by an inverter, wherein said inverter is controlled in response to a torque/speed command from an inverter controller, and wherein said system further includes a DC-to-DC converter coupled to said high-voltage battery to provide a reduced voltage to charge a low-voltage battery, said torque estimator comprising:

a synchronous coordinate battery model for transforming a value proportional to a measured voltage and internal resistance of said high-voltage battery into a synchronous battery voltage and internal resistance;

a motor thermal saturation model for generating a flux linkage signal in response to a quadrature current limit and a temperature of said traction motor;

a battery/inverter/motor model for generating an available quadrature current signal corresponding to a maximum available torque in response to a current command, said flux linkage signal, and said synchronous battery voltage;

a clamp for generating a clamped quadrature current signal in response to said available quadrature current signal and predetermined clamping limits to prevent said traction motor system from exceeding maximum current and voltage limits, to protect said traction motor and said inverter from excessive thermal heating, and to protect said high voltage battery from excessive charging or discharging;

a first torque estimator for generating a first estimated available torque in response to said clamped quadrature current signal and said flux linkage;

a power usage estimator for generating a power usage signal in response to power consumed in said DC-to-DC converter, power loss in said DC-to-DC converter, and power loss in said traction motor and inverter;

a second torque estimator for generating a second estimated available torque in response to said power usage signal, an available battery power of said high-voltage battery, and an angular speed of said traction motor; and a selector for selecting a lesser one of said first and second estimated available torques as an estimated available torque value.

14. The torque estimator of claim 13 further comprising:

a multiplier for generating an estimated available power value in response to said estimated available torque value and said angular speed.

15. The torque estimator of claim 13 wherein said available battery power is comprised of a maximum output power in a discharge mode of said high-voltage battery and wherein said estimated available torque value is comprised of an estimated maximum torque output that can be produced by said battery-powered traction motor system in said discharge mode.

16. The torque estimator of claim 13 wherein said available battery power is comprised of a maximum input power in a charge mode of said high-voltage battery and wherein said estimated available torque value is comprised of an estimated maximum torque load that can be consumed by said battery-powered traction motor system in said charge mode.

17. The torque estimator of claim 13 wherein said available battery power is comprised of a transient capacity of said high-voltage battery and wherein said estimated available torque value corresponds to a transient torque capacity.

18. The torque estimator of claim 13 wherein said available battery power is comprised of a substantially continuous capacity of said high-voltage battery and wherein said estimated available torque value corresponds to a continuous torque capacity.

19. An electric vehicle comprising:

a battery-powered traction motor system including a high-voltage battery coupled to a traction motor by an inverter, wherein said inverter is controlled in response to a torque/speed command from an inverter controller;

a low-voltage battery;

a DC-to-DC converter coupled to said high-voltage battery to provide a reduced voltage to charge said low-voltage battery; and a torque estimator comprising:

a synchronous coordinate battery model for transforming a value proportional to a measured voltage and internal resistance of said high-voltage battery into a synchronous battery voltage and internal resistance;

a motor thermal saturation model for generating a flux linkage signal in response to a quadrature current limit and a temperature and magnetic saturation of said traction motor;

a battery/inverter/motor model for generating an available quadrature current signal corresponding to a maximum available torque in response to said torque/speed command, said flux linkage signal, and said synchronous battery voltage;

a clamp for generating a clamped quadrature current signal in response to said available quadrature current signal and predetermined clamping limits to prevent said traction motor system from exceeding maximum current and voltage limits, to protect said traction motor and said inverter from excessive thermal heating, and to protect said high voltage battery from excessive charging or discharging;

a first torque estimator for generating a first estimated available torque in response to said clamped quadrature current signal and said flux linkage signal;

a power usage estimator for generating a power usage signal in response to power consumed in said DC-to-DC converter, power loss in said DC-to-DC converter, and power loss in said traction motor and inverter;

a second torque estimator for generating a second estimated available torque in response to said power usage signal, an available battery power of said high-voltage battery, and an angular speed of said traction motor; and a selector for selecting a lesser one of said first and second estimated available torques as an estimated available torque value.

20. The electric vehicle of claim 19 further comprising:

an internal combustion engine coupled to said traction motor system.

* * * * *